(12) United States Patent
Blomstedt

(10) Patent No.: US 12,019,259 B2
(45) Date of Patent: Jun. 25, 2024

(54) WAVEGUIDE DISPLAY AND DISPLAY ELEMENT WITH NOVEL GRATING CONFIGURATION

(71) Applicant: DISPELIX OY, Espoo (FI)

(72) Inventor: Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 17 days.

(21) Appl. No.: 16/954,957

(22) PCT Filed: Dec. 20, 2018

(86) PCT No.: PCT/FI2018/050959
§ 371 (c)(1),
(2) Date: Jun. 17, 2020

(87) PCT Pub. No.: WO2019/122529
PCT Pub. Date: Jun. 27, 2019

(65) Prior Publication Data
US 2020/0379158 A1   Dec. 3, 2020

(30) Foreign Application Priority Data

Dec. 22, 2017  (FI) .................................... 20176157

(51) Int. Cl.
*G02B 27/00*   (2006.01)
*F21V 8/00*    (2006.01)
(52) U.S. Cl.
CPC ......... *G02B 6/0016* (2013.01); *G02B 6/0036* (2013.01); *G02B 27/0012* (2013.01); *G02B 27/0081* (2013.01)

(58) Field of Classification Search
None
See application file for complete search history.

(56) References Cited

U.S. PATENT DOCUMENTS 5,101,458 A * 3/1992 Spaulding ................ G02B 6/34
                                                    385/36
2002/0024733 A1* 2/2002 Katsuma ................ G02B 27/09
                                                    359/569
(Continued)

FOREIGN PATENT DOCUMENTS

CN      101149445 A    3/2008
WO      9719821 A1     6/1997
(Continued)

OTHER PUBLICATIONS

Han J. et al, "Portable waveguide display system with a large field of view by integrating freeform elements and volume holograms", Optics Express. (2015) 3. 3534. 10.1364/OE.23.003534.
(Continued)

*Primary Examiner* — Chris H Chu
(74) *Attorney, Agent, or Firm* — Maschoff Brennan

(57) ABSTRACT

The invention concerns a waveguide display and display element therefor, and a method of designing a waveguide element. The element comprises a waveguide and at least one grating arranged on or within the waveguide, the at least one grating being arranged to couple visible light into, within, and/or out of the waveguide. According to the invention, the period of the grating is in the range of 5 μm or more. The invention increases freedoms of design of grating-based display elements and allows for better color and FOV control.

20 Claims, 2 Drawing Sheets

(56) References Cited

U.S. PATENT DOCUMENTS

| | | | |
|---|---|---|---|
| 2003/0027327 A1* | 2/2003 | Cunningham | B01L 3/5085 |
| | | | 435/287.2 |
| 2010/0085642 A1 | 4/2010 | Drinkwater | |
| 2011/0038049 A1 | 2/2011 | Vallius | |
| 2012/0127577 A1 | 5/2012 | Desserouer | |
| 2013/0127689 A1 | 5/2013 | Gollier | |
| 2014/0307321 A1 | 10/2014 | Schilling | |
| 2017/0153373 A1* | 6/2017 | Divliansky | G02B 6/34 |
| 2017/0363871 A1 | 12/2017 | Vallius | |
| 2018/0024286 A1* | 1/2018 | Schubert | G02B 6/0006 |
| | | | 362/553 |
| 2018/0031752 A1* | 2/2018 | Ferrini | G02B 6/0016 |
| 2018/0128962 A1* | 5/2018 | Kim | G02B 6/0061 |

FOREIGN PATENT DOCUMENTS

| | | |
|---|---|---|
| WO | 2008053078 A1 | 5/2008 |
| WO | 2009/083977 A2 | 7/2009 |
| WO | 2017062167 A1 | 4/2017 |

OTHER PUBLICATIONS

EP Search Report in Application No. 18891534.2 dated Aug. 2, 2021.
CN Office Action in Application No. 201880082066.6 dated Aug. 4, 2021.

\* cited by examiner

WAVEGUIDE DISPLAY AND DISPLAY ELEMENT WITH NOVEL GRATING CONFIGURATION

FIELD OF THE INVENTION

The invention relates to grating-based waveguide displays and waveguide elements thereof. In particular, the invention relates to in-coupling, pupil expansion and out-coupling gratings for such displays.

BACKGROUND OF THE INVENTION

Head-mounted displays (HMDs) and head-up displays (HUDs) can be implemented using waveguide technology. Light can be coupled to a waveguide, redirected therein or coupled out of the waveguide using diffraction gratings. In one conventional display design, light is directed from a projector to a one-dimensional in-coupling grating, which diffracts the wavelengths of the incoming light into the waveguide, where they propagate via total internal reflections towards an out-coupling grating. The out-coupling grating diffracts light out of the waveguide, reproducing the image originally displayed to the in-coupling grating. An exit pupil expander grating can be used between the in- and out-coupling gratings to extend the viewable area of the display laterally. The gratings have periods which are in the order of wavelength of visible light.

Recently, much effort has been put on extending the field-of-view (FOV) of waveguide displays in particular in the HMD field. In the basic configuration, the FOV is fundamentally limited by the material chosen for the waveguide, but there are many attempts to make the apparent FOV larger for improving user experience. For example, Han J. et al, "Portable waveguide display system with a large field of view by integrating freeform elements and volume holograms", Optics Express. 23. 3534. 10.1364/OE.23.003534, discuss the use of volume holograms for extending the FOV. The FOV limit has also given raise to several multi-layer designs in which different colors of the original light are directed to and propagated in different waveguide layers for allowing better color control and reproduction.

There is, however, need for alternative and improved means for increasing freedoms of design, FOV and providing better color control in waveguide displays.

SUMMARY OF THE INVENTION

It is an aim of the invention to solve at least some problems of the prior art and to provide a novel waveguide display element and a waveguide display device utilizing such element.

Particular aims include achieving grating structures which provide new freedom of design, which can be used e.g. for increasing the FOV of the element or controlling colors better. One specific aim is to provide a grating configuration which allows at least partial achromatization of the grating.

The invention is based on providing a grating which has a substantially larger period than the wavelength of visible light. In particular, the period is at least fivefold compared to the maximum visible light wavelength (700 nm) and typically 5 µm or more. Such gratings are still diffractive for incident light beams that are larger than the period, as the case typically is in display applications, but their diffraction is not limited to conventional few diffraction orders (+/−1 and 0).

In a first aspect, the invention provides a waveguide display element comprising a waveguide and at least one grating arranged on or within the waveguide, the at least one grating being arranged to couple visible light into, within, and/or out of the waveguide, wherein the period of the grating is in the range of 5 µm or more, such as 5-1000 µm. Each period of the grating may comprise a one- or two-dimensional non-periodic microstructure pattern which repeats from period to period.

According to a second aspect there is provided a waveguide display device comprising a waveguide display element comprising a waveguide region, an in-coupling grating according to couple incoming light into the waveguide and an out-coupling grating adapted to couple light out of the waveguide into an eye of a user. At least one of the gratings has a period in the range of 5 µm or more. In addition, there is provided an image projector capable of illuminating the in-coupling grating.

According to a third aspect, there is provided a method comprising
- choosing a waveguide having a thickness and material,
- choosing one or more grating regions on the waveguide,
- choosing at least one optical performance target of the waveguide for light diffracting via said one or more gratin regions,
- providing a grating optimization processor containing a grating model having as a variable at least one of the following: period of the grating and microstructure of the grating unit,
- keeping the period of the grating above 5 µm, running the grating optimization processor for optimizing the at least one variable of the grating model so that the grating satisfies said optical performance target when placed on said one or more grating regions.

The method may optionally comprise manufacturing the waveguide having a grating in accordance with the grating model and the at least one optimized variable.

In particular, the invention is characterized by what is stated in the independent claims.

The invention offers significant benefits. The proposed solution allows for the utilization of many more diffraction orders than conventional short-period gratings. The division of diffraction angles is finer and therefore the amount of image data that can be carried inside the waveguide is bigger than in the case of conventional gratings.

In addition, the invention allows for complete separation of the behaviour of different wavelength bands, such as the commonly used red, blue and green wavelength bands. For example, the grating structure may be designed so that these bands are diffracted essentially to the same angles inside the waveguide, utilizing different orders of diffraction for each band and for each angle of incidence. This is in contrast with conventional short-period gratings, in which typically only the first diffraction order is available for light transmission along the waveguide, resulting in different diffraction angles for different wavelength bands. Thus, by means of the invention, an achromatic waveguide element is feasible.

These factors provide new freedoms of design for waveguide displays. In conventional gratings, although the grating profile can be varied in order to divide power between diffraction orders, there are no or only few "spare" diffraction orders available where power can be directed. In a large-period grating, the amount of diffraction orders is higher and also the microstructure of the grating is wide, thereby offering a lot more design options. This makes for example the achromatization of the waveguide possible.

The invention allows for tailoring the grating for different purposes. In some conventional grating design processes first the behaviour of a limited set of gratings is computed and then those having the best performance (but still usually far from optimal) in the application concerned are chosen. By means of the invention, this design scheme can be radically improved: one can differentiate the design of the waveguide and the grating to a higher degree and optimize them separately. Specifically, the waveguide optimization leads to a set of required grating responses, which are then the targets for the grating optimizations. The additional freedoms available when large-period gratings are used makes it possible to find good solutions to the latter optimization problems, a feat that cannot be achieved with short-period gratings.

User experience of HMD and HUD devices can also be improved. For example, diffracting different colors to (approximately) the same angle in a controlled way as herein described allows for increasing the FOV of the element. Also, a further increase in the FOV can be achieved by utilizing the finer angular division of the diffraction order angles by directing different FOV angle-ranges into different diffraction orders, thus essentially performing compression/decompression of the FOV inside the waveguide.

The dependent claims are directed to selected embodiments of the invention.

The grating can be one- or two-dimensionally periodic. In case the grating is periodic in two dimensions, the period in each of the two dimensions is preferably in the range of 5 μm or more.

In some embodiments, the grating is adapted to produce wavelength-dependent and incident angle-dependent division of diffraction efficiencies to different propagating angles in the waveguide. For example, the grating may be adapted to diffract at least two different wavelengths having the same angle of incidence into approximately (+/−5 degrees) the same diffraction angle using different diffraction orders. This kind of behaviour/grating is herein called achromatic multi-order behavior/grating. In a further embodiment, the grating is achromatic in this sense for at least three different wavelength bands and for at least two angles of incidence having an angle separation of at least 30 degrees.

In some embodiments, the grating is adapted to couple light into or out of the waveguide at a field-of-view of at least 60 degrees.

Next, selected embodiments of the invention and advantages thereof are discussed in more details with reference to the attached drawings.

DETAILED DESCRIPTION OF EMBODIMENTS

Definitions

"(Grating) unit element" refers to the largest non-periodic unit that repeats inside the grating in one or two dimensions. The dimension, or two lateral dimensions, of the grating unit determines the period or periods, respectively, of the grating.

"Feature" refers to a geometric formation inside the unit element.

Unless otherwise mentioned, the term "wavelength band" herein means a band having a width of 20 nm or less, in particular 10 nm or less. In an RGB element or display, these wavelength bands can be chosen for example from the wavelength ranges of 600-750 nm, 495-600 nm and 450-495 nm, correspondingly. The number of bands can also be more than 3, such as 4-6.

"Achromatic" grating herein means a grating which, generates approximately the same response (i.e. approximately the same angular intensity distribution) for different wavelengths for a fixed incident angle and intensity. Herein, "approximately the same response" means that the relative intensity distribution is within −/+10% for all wavelengths going to the same angle (with an angular accuracy of 5 degrees, in particular 2 degrees). Relative intensity is determined as the proportion of intensity of light diffracted to a particular angle to the intensity of the incident light.

While it is possible to manufacture essentially entirely achromatic gratings using the presently disclosed principles for operating ranges that constitute only a limited number of narrow wavelength ranges. However, herein the term has a wider meaning and covers gratings satisfying the above-mentioned condition. In practical applications, it is often sufficient that the achromatic condition is satisfied for the extreme angles of incidence of incoming light that are used in the device concerned. Between the extreme angles, the distributions of the rays with different wavelengths may overlap more freely.

Waveguide display devices and elements as herein used refer to devices and elements of producing a viewable image at least substantially maintaining relative pixel positions of an image to be displayed.

Description of Selected Embodiments

Figure 1A:
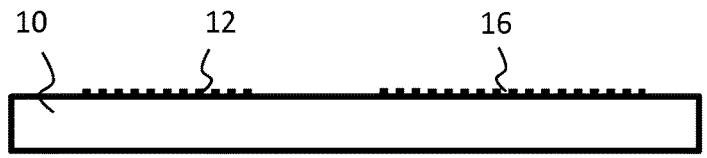
FIGS. 1A and 1B shows side and top views, respectively, of a display element with two two-dimensional large-period gratings arranged thereon.
Figure 1B:
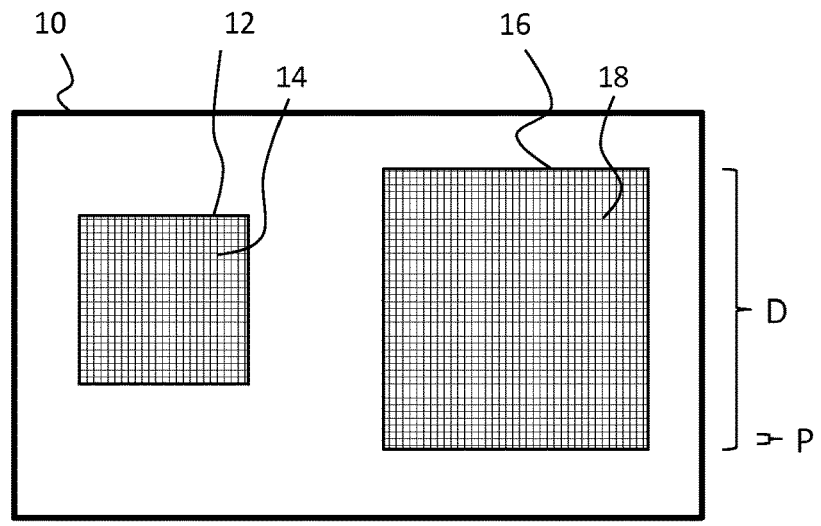
Figure 1C:
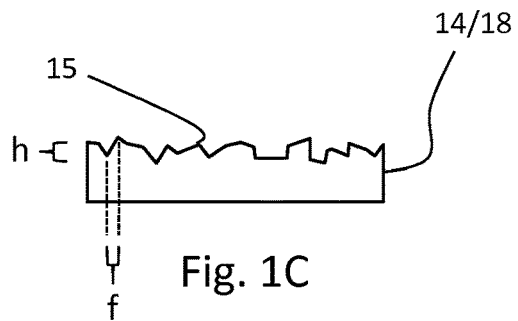
FIGS. 1C and 1D show side and top views, respectively, of a microstructure of a single period of a large-period grating.

FIGS. 1A and 1B show an exemplary waveguide element in a cross-sectional side view and top view. The element comprises an in-coupling grating 12 and an out-coupling grating 16 laterally positioned with respect to each other on a waveguide body 10. The gratings 12, 16 are composed of repeating unit elements 14, 18, which have a side length P, corresponding to the period of the gratings 12, 16. The dimensions of the gratings as a whole (like dimension D of the out-coupling grating 16) can be e.g. 100-10000 times the period P, depending on the application.

In some embodiments, the grating is a one-dimensional grating, in which case a suitable period range is 5-1000 μm, such as 10-500 μm.

In some embodiments, the grating is a two-dimensional grating, whereby its period in each periodic direction can be e.g. 5-75 μm, such as 10-50 μm.

The element may also comprise guide gratings, exit pupil expander gratings or the like.

The unit elements 14, 18 of different gratings may be similar or different. The period is, however, in typical embodiments the same.

Figure 1D:
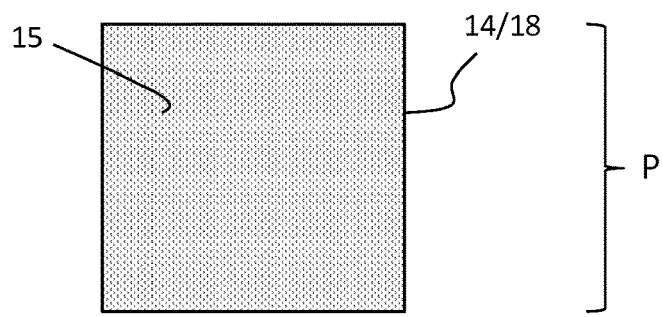

FIGS. 1O and 1D show an exemplary unit element in cross-sectional side view and top view. The unit element has a surface profile 15, which is essentially non-periodic, in order not to decrease the effective period of the grating. The structure is composed of microfeatures, which have the average size f and maximum height of h. Herein, f is defined as the average distance from the bottom of a valley to the top of the neighboring peak.

The feature size f can be e.g. 10-700 nm and maximum height h e.g. 20-500 nm.

Figure 2:
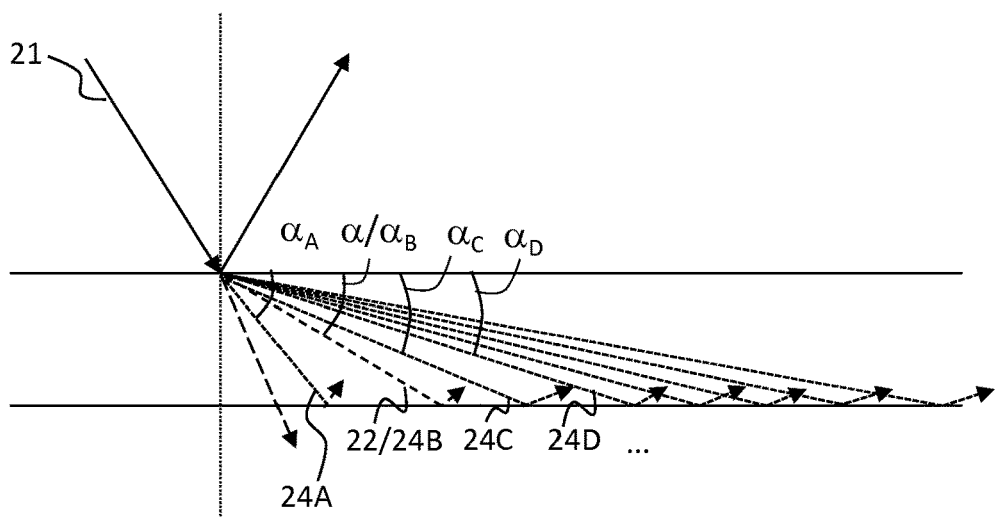
FIG. 2 illustrates the finer set of diffraction angles available in the invention.

FIG. 2 illustrates the finer diffraction angle division. Whereas a conventional small-period grating is capable of producing effectively only a single propagating diffraction order beam 22 at angle α for incident light 21, the present grating can diffract beams 24A, 24B, 24C, 24D, . . . in several propagating diffraction orders at angles $\alpha_A$, $\alpha_B$, $\alpha_C$, $\alpha_D$ . . . .

Figure 3A:
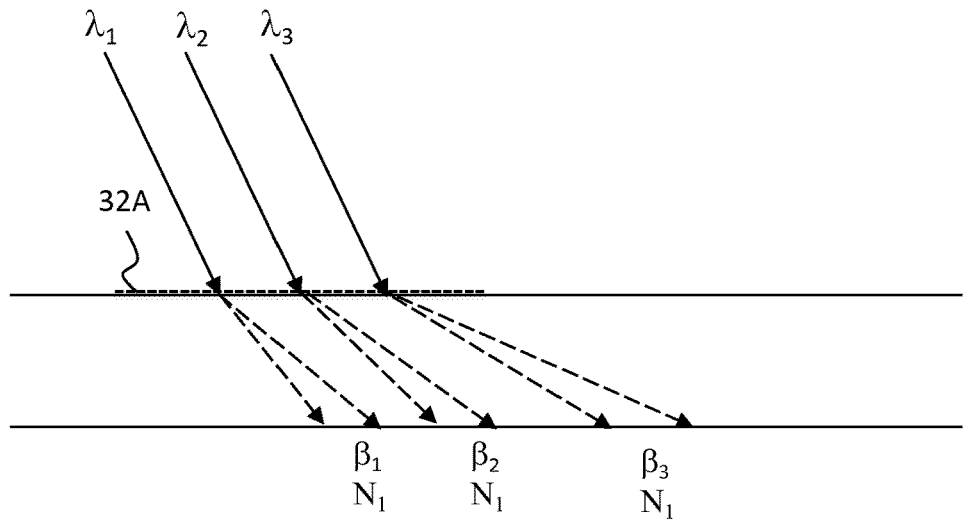
FIGS. 3A and 3B illustrate the behavior of different wavelength bands on a conventional grating and a large-period grating according to one embodiment of the invention, correspondingly.
Figure 3B:
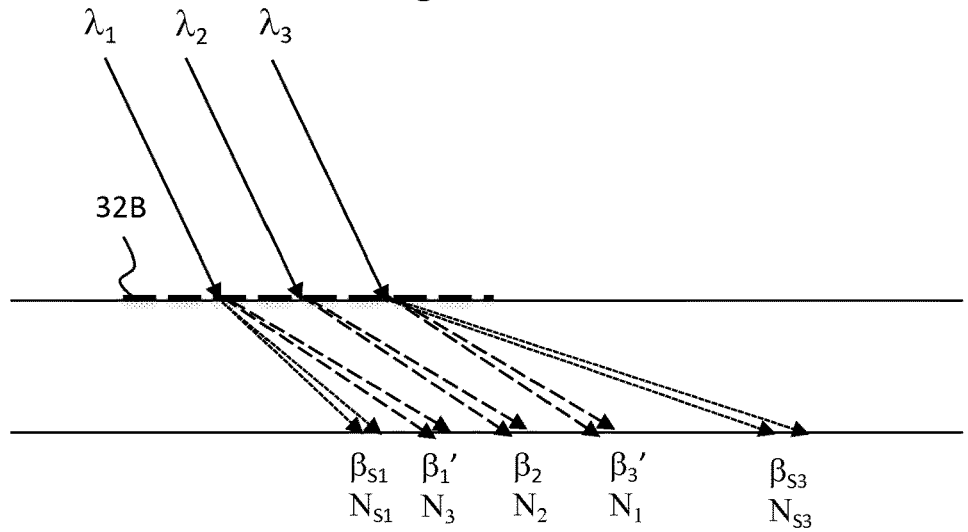

FIGS. 3A and 3B illustrate how the finer angle division and design of the grating unit can be taken advantage of to produce a wavelength-dependent and incident angle-dependent division of diffraction efficiencies to different angles. In this example, an achromatic grating is illustrated.

FIG. 3A shows how three wavelength bands at $\lambda_1$, $\lambda_2$, $\lambda_3$ having the same incident angle behave at a conventional grating 32A. One sees dispersive diffraction into the first propagating diffraction order $N_1$ to angles $\beta_1$, $\beta_2$, $\beta_3$, respectively, the amount of dispersion depending on the breadth of the bands.

In FIG. 3B, the grating is replaced with a large-period grating 32B, which is configured to diffract majority of light at band $\lambda_1$ to diffraction order $N_3$, at band $\lambda_2$ to diffraction order $N_2$ and at band $\lambda_3$ to diffraction order $N_1$, which all have essentially the same angle, i.e. $\beta_1'=\beta_2'=\beta_3'$. Stray light of band $\lambda_1$ and band $\lambda_3$ goes to stray diffraction orders $N_{S1}$, and $N_{S3}$ having an angle $\beta_{S1}$ and $\beta_{S3}$ different from $\beta_1'=\beta_2'=\beta_3'$. The grating can be configured to do the same for a plurality of incident angles. It must be noted that in the FIG. 3B only some stray diffraction orders have been illustrated, but in practice a small (controlled) amount of light is inevitably diffracted to all available orders.

In one embodiment, different incident angle ranges are diffracted into different diffraction orders.

Thus, the suggested grating structure/configuration can be used to "compress"/"decompress" the angular range of the diffracted light into a smaller/larger range, which can be used to increase the FOV of the element.

In typical embodiments, the majority of energy of incoming light is guided to a set of diffraction orders (primary diffraction orders) that is smaller than the set of all available diffraction orders. The remaining orders (secondary diffraction orders) may be used to carry stray light, as determined in grating optimization, in order to maximize the power to the primary diffraction orders or to satisfy other design targets. The number of primary diffraction orders can be e.g. 10 or less, such as 5 or less.

When inspected in the normalized wave vector space (k-space with lengths divided by k) of the light field, a conventional grating introduces a linear shift, whose direction and magnitude depends on the diffraction order, but not on the wavelength. In contrast to that, the present grating can induce non-linear shifts, which may be utilized to achieve for example compression/decompression of the angular spread and essentially achromatic behaviour for across small sets of narrow wavelength-bands.

In one embodiment, the present method comprises
choosing a waveguide having a thickness and material,
choosing one or more grating regions on the waveguide,
choosing at least one optical performance target of the waveguide for light diffracting via said one or more grating regions,
providing a grating model having as a variable at least one of the following: period of the grating and microstructure of the grating unit,
keeping the period of the grating above 5 μm, optimizing the at least one variable of the grating model so that the grating satisfied said optical performance target when placed on said one or more grating regions.

In a further embodiment, the at least one performance target comprises the diffraction of at least three separate wavelength bands, such as red, green and blue bands, having the same angle of incidence essentially to the same angle using different diffraction orders for each band. In a further embodiment, the at least one performance target comprises this condition to hold for several different angles of incidence, such as for at least 100 angles of incidence.

In a further embodiment, the method comprises manufacturing the waveguide having said grating on said one or more grating regions.

The detailed, sub-micrometer scale, structure of the present grating depends on the performance target and leans on the principle of using a great number of diffraction orders (in particular ≥10) as targets of light. In one embodiment, the diffraction to secondary diffraction orders is not forced to zero, but is allowed to carry a portion of light in order to increase the freedoms of design to achieve the performance target. In general, to optimize the structure, one can for example apply optimization strategies and ideas, such as the above one of not forcing secondary diffraction orders to zero, that are known from the design of so-called computer-generated holograms (CGHs). For the grating computations we recommend the use of recently developed publicly available fast methods, such as those discussed in A. Shcherbakov and A. V. Tishchenko, "*New fast and memory-sparing method for rigorous electromagnetic analysis of 2D periodic dielectric structures*", *J. Quant. Spectrosc. Ra.*, 113, 158-171, 2012 and A. Junker and K.-H. Brenner, "*High mode count rigorous simulation of diffractive optical elements by an iterative solution approach*", EOS Topical Meeting on Diffractive Optics 2017, p. 23, to obtain realistic computation times.

Embodiments of the invention can be utilized in various personal display devices, augmented reality (AR), virtual reality (VR) and mixed reality (MR) devices, like near-to-the-eye displays (NEDs) and other head-mounted displays (HMDs), as well as head-up displays (HUDs), in their different forms.

CITATIONS LIST

Non-Patent Literature

Han J. et al, "*Portable waveguide display system with a large field of view by integrating freeform elements and volume holograms*", Optics Express. 23. 3534. 10.1364/OE.23.003534

A. Shcherbakov and A. V. Tishchenko, "*New fast and memory-sparing method for rigorous electromagnetic analysis of 2D periodic dielectric structures*", *J. Quant. Spectrosc. Ra.*, 113, 158-171, 2012

A. Junker and K.-H. Brenner, "*High mode count rigorous simulation of diffractive optical elements by an iterative solution approach*", *EOS Topical Meeting on Diffractive Optics* 2017, p. 23

The invention claimed is:

1. A waveguide image display element comprising:
   a waveguide; and
   at least one achromatic grating arranged on or within the waveguide, each achromatic grating being arranged to directly couple visible light into, within, and/or out of the waveguide, wherein the period of each achromatic grating is in the range of 5 um or more,
   wherein each achromatic grating is configured as a seamless multi-order grating in direct optical coupling with the waveguide for diffracting at least two different wavelengths having the same angle of incidence into approximately the same diffraction angle using different diffraction orders directly with the waveguide, which same diffraction angle is within a difference of less than or about 5 degrees for the at least two different wavelengths, wherein the diffracted at least two different wavelengths have approximately the same intensity.

2. The display element according to claim 1, wherein the period of each achromatic grating is in the range of 5-1000 µm, such as 5-75 µm.

3. The display element according to claim 2, wherein each period of the at least one achromatic grating comprises a non-periodic micro structure pattern which repeats from period to period.

4. The display element according to claim 2, wherein the period of each achromatic grating is in the range of 10 µm or more, in particular 10-50 µm for a two-dimensional grating and 10-500 µm for a one-dimensional grating.

5. The display element according to claim 4, wherein each period of the at least one achromatic grating comprises a non-periodic micro structure pattern which repeats from period to period.

6. The display element according to claim 1, wherein each period of each achromatic grating comprises a non-periodic microstructure pattern which repeats from period to period.

7. The display element according claim 1, wherein each achromatic grating is periodic in two dimensions, the period in each of said two dimensions being in said range.

8. The display element according to claim 1, wherein each achromatic grating is adapted to produce wavelength-dependent and incident angle-dependent division of diffraction efficiencies to different propagating angles in the waveguide.

9. The display element according to claim 1, wherein each achromatic grating is achromatic for at least three different wavelength bands for at least 50 angles of incidence spread over an angle range of at least 20 degrees.

10. The display element according to claim 1, wherein each achromatic grating is adapted to couple light into or out of the waveguide at a field-of-view of at least 60 degrees.

11. The display element according to claim 1, being an image display element suitable for a near-to-the-eye display (NED), head-mounted display (HMD) or head-up display (HUD) device.

12. The display element according to claim 1, wherein the period of the at least one achromatic grating is in the range of 10 µm or more, in particular 10-50 µm for a two-dimensional grating and 10-500 µm for a one-dimensional grating.

13. The display element according to claim 12, wherein each period of the at least one achromatic grating comprises a non-periodic micro structure pattern which repeats from period to period.

14. The display element according to claim 1, wherein the approximately the same diffraction angle using different diffraction orders is within a difference of less than or about 2 degrees.

15. A waveguide display device comprising:
   a waveguide image display element comprising a waveguide and an in-coupling grating configured to directly couple incoming light into the waveguide,
   an out-coupling grating adapted to directly couple light out of the waveguide into an eye of a user, and
   an image projector capable of illuminating the in-coupling grating,
   wherein at least one of the grating of the out-coupling grating or in-coupling grating has a period in the range of 5 µm or more,
   wherein the at least one grating is an achromatic grating configured as a seamless multi-order grating in direct optical coupling with the waveguide for diffracting at least two different wavelengths having the same angle of incidence into approximately the same diffraction angle using different diffraction orders directly with the waveguide, which same diffraction angle is within a difference of less than or about 5 degrees for the at least two different wavelengths, wherein the diffracted at least two different wavelengths have about the same intensity.

16. The display device according to claim 15, wherein the display element includes:
   a waveguide; and
   the at least one grating arranged on or within the waveguide, the at least one grating being arranged to directly couple visible light into, within, and/or out of the waveguide, wherein the period of the grating is in the range of 5 µm or more.

17. A method of designing, and optionally manufacturing a waveguide element, the method comprising:
   choosing a waveguide having a thickness and material,
   choosing one or more grating regions on the waveguide that will directly couple light into, within, or out of the waveguide,
   choosing at least one optical performance target of the waveguide for light diffracting via said one or more grating regions,
   providing a grating optimization processor containing a grating model having as a variable at least one of the following: period of the grating and microstructure of the grating unit, and
   keeping the period of the grating above 5 µm, running the grating optimization processor for optimizing the at least one variable of the grating model so that the grating satisfies said optical performance target when placed on said one or more grating regions,
   wherein the one or more grating regions include at least one grating that is an achromatic grating configured as a seamless multi-order grating in direct optical coupling with the waveguide for diffracting at least two different wavelengths having the same angle of incidence into approximately the same diffraction angle using different diffraction orders directly with the waveguide, which same diffraction angle is within a difference of less than or about 5 degrees for the at least two different wavelengths, wherein the diffracted at least two different wavelengths have about the same intensity.

18. The method according to claim 17, wherein the at least one performance target comprises the diffraction of at least three separate wavelength bands, such as red, green and blue bands, having the same angle of incidence essentially to the same angle using different diffraction orders for each band.

19. The method according to claim 18, comprising manufacturing the waveguide having said at least one grating on said one or more grating regions.

20. The method according to claim 17, comprising manufacturing the waveguide having said at least one grating on said one or more grating regions.

* * * * *